(12) United States Patent
Goel et al.

(10) Patent No.: US 12,363,790 B2
(45) Date of Patent: Jul. 15, 2025

(54) PROCESSOR AND USER EQUIPMENT FOR REDUCING POWER CONSUMPTION DURING DRX

(71) Applicant: Apple Inc., Cupertino, CA (US)

(72) Inventors: Neha Goel, Herndon, VA (US); Murali Narasimha, San Ramon, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 449 days.

(21) Appl. No.: 17/853,823

(22) Filed: Jun. 29, 2022

(65) Prior Publication Data

US 2024/0008136 A1 Jan. 4, 2024

(51) Int. Cl.
*H04W 76/28* (2018.01)
*H04W 72/1268* (2023.01)
*H04W 72/23* (2023.01)

(52) U.S. Cl.
CPC ....... *H04W 76/28* (2018.02); *H04W 72/1268* (2013.01); *H04W 72/23* (2023.01)

(58) Field of Classification Search
CPC .. H04W 76/28; H04W 72/1268; H04W 72/23
See application file for complete search history.

(56) References Cited

U.S. PATENT DOCUMENTS

| | | | |
|---|---|---|---|
| 10,999,863 B2 | 5/2021 | Jeon et al. | |
| 11,013,056 B2 | 5/2021 | Shukair et al. | |
| 2013/0242726 A1* | 9/2013 | Zhu | H04L 1/1635 370/329 |
| 2018/0234920 A1* | 8/2018 | Bae | H04W 52/0216 |
| 2020/0413434 A1 | 12/2020 | Zhou et al. | |

FOREIGN PATENT DOCUMENTS

| | | |
|---|---|---|
| WO | WO 2022/025425 | 2/2022 |
| WO | WO 2022/025472 | 2/2022 |

* cited by examiner

*Primary Examiner* — Jamal Javaid
(74) *Attorney, Agent, or Firm* — Fish & Richardson P.C.

(57) ABSTRACT

A processor determines that a UE operates in a DRX cycle including a DRX-on duration followed by a DRX-sleep duration. The processor configures a plurality of periodic uplink CG occasions within the DRX cycle. Each uplink CG occasion supports uplink transmission of a predefined size. The processor reads a data buffer to determine a size of accumulated data. At a given uplink CG occasion, the processor compares the size of accumulated data with an upper threshold data size and a lower threshold data size. Responsive to a first comparison result, the processor transmits the accumulated data over one or more uplink CG occasions starting from the given uplink CG occasion. Responsive to a second comparison result, the processor transmits a BSR at the given uplink CG occasion. Responsive to a third comparison result, the processor transmits neither the accumulated data nor the BSR at the given uplink CG occasion.

19 Claims, 9 Drawing Sheets

PROCESSOR AND USER EQUIPMENT FOR REDUCING POWER CONSUMPTION DURING DRX

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation (5G) New Radio (NR). The wireless communication networks facilitate mobile broadband service using technologies such as OFDM, multiple input multiple output (MIMO), advanced channel coding, massive MIMO, beamforming, and/or other features.

User equipment (UE) is a type of wireless user device commonly used in wireless communication networks. Recent UEs have implemented a feature of discontinuous reception (DRX), which allows a UE to periodically enter a sleep mode and pause transmission and reception in order to save power. When a UE is in a DRX state, the UE can be configured with periodic uplink configured-grant (CG) occasions where the UE can temporarily wake up from sleep and conduct transmission and reception.

SUMMARY

In accordance with one aspect of the present disclosure, a processor includes circuitry to execute one or more instructions that, when executed, cause a UE to perform operations. The operations involve determining that a UE operates in a DRX cycle, where the DRX cycle may include a DRX-on duration followed by a DRX-sleep duration. The operations also involve configuring a plurality of periodic uplink CG occasions within the DRX cycle, where each uplink CG occasion supports uplink transmission of a predefined size. The operations also involve reading a data buffer to determine a size of accumulated data. The operations also involve, at a given uplink CG occasion, comparing the size of accumulated data with an upper threshold data size and a lower threshold data size. In response to a first comparison result, the operations involve transmitting the accumulated data over one or more uplink CG occasions starting from the given uplink CG occasion. In response to a second comparison result, the operations involve transmitting a buffer status report (BSR) at the given uplink CG occasion. In response to a third comparison result, the operations involve transmitting neither the accumulated data nor the BSR at the given uplink CG occasion.

In some implementations, the operations involve: determining the upper threshold data size by multiplying the predefined size by a maximum number of uplink CG occasions.

In some implementations, the first comparison result is determined when the size of accumulated data is between the lower threshold data size and the upper threshold data size.

In some implementations, the second comparison result is determined when: the first comparison result is not determined; the size of accumulated data is greater than zero and less than the lower threshold data size; and the given uplink CG occasion is a last uplink CG occasion within the DRX cycle.

In some implementations, the third comparison result is determined when: the first comparison result is not determined; the size of accumulated data is less than the lower threshold data size; and the second comparison result is not determined.

In some implementations, the operations involve: in response to determining none of the first comparison result, the second comparison result, and the third comparison result, transmitting the BSR at the given uplink CG occasion.

In accordance with one aspect of the present disclosure, a UE includes: a processor; a memory with a data buffer; and a transmitter. The processor determines that the UE operates in a DRX cycle, which includes a DRX-on duration followed by a DRX-sleep duration. The processor configures a plurality of periodic uplink CG occasions within the DRX cycle, each uplink CG occasion supporting uplink transmission of a predefined size. The processor reads the data buffer to determine a size of accumulated data. At a given uplink CG occasion, the processor compares the size of accumulated data with an upper threshold data size and a lower threshold data size. In response to a first comparison result, the transmitter transmits the accumulated data over one or more uplink CG occasions starting from the given uplink CG occasion. In response to a second comparison result, the transmitter transmits a buffer status report (BSR) at the given uplink CG occasion. In response to a third comparison result, the transmitter transmits neither the accumulated data nor the BSR at the given uplink CG occasion.

In some implementations, the processor determines the upper threshold data size by multiplying the predefined size by a maximum number of uplink CG occasions.

In some implementations, the processor determines the first comparison result when the size of accumulated data is between the lower threshold data size and the upper threshold data size.

In some implementations, the processor determines the second comparison result when: the first comparison result is not determined; the size of accumulated data is greater than zero and less than the lower threshold data size; and the given uplink CG occasion is a last uplink CG occasion within the DRX cycle.

In some implementations, the processor determines the third comparison result when: the first comparison result is not determined; the size of accumulated data is less than the lower threshold data size; and the second comparison result is not determined.

In some implementations, in response to that the processor determines none of the first comparison result, the second comparison result, and the third comparison result, the transmitter transmits the BSR at the given uplink CG occasion In accordance with one aspect of the present disclosure, a processor includes circuitry to execute one or more instructions that, when executed, cause the UE to perform operations. The operations involve: determining that a UE operates in a DRX cycle, wherein the DRX cycle comprises a DRX-on duration followed by a DRX-sleep duration. The operations also involve configuring a plurality of periodic uplink CG occasions within the DRX cycle. The operations also involve, at a given uplink CG occasion, determining whether the given uplink CG occasion is a last uplink CG occasion within the DRX cycle. In response to determining that the given uplink CG occasion is the last uplink CG occasion, the operations involve transmitting a BSR at the given uplink CG occasion to a base station. In response to determining that the given uplink CG occasion is not the last uplink CG occasion, the operations involve transmitting neither the BSR nor buffered data at the given uplink CG occasion to the base station.

In some implementations, determining whether the given uplink CG occasion is a last uplink CG occasion within the DRX cycle includes: receiving, from the base station, a timer parameter determined based on a length of the DRX cycle and a periodicity of the plurality of periodic uplink CG occasions; and starting the timer at a certain moment of the DRX cycle.

In some implementations, the timer parameter is determined as $$\frac{DRXcycle}{CGperiodicity} - 1,$$

where DRXcycle denotes the length of the DRX cycle and CGperiodicity denotes the periodicity of the plurality of periodic uplink CG occasions.

In some implementations, the timer parameter is configured in response to establishing a dedicated bearer.

The previously-described aspects are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

The details of one or more implementations of these systems and methods are set forth in the accompanying drawings and the description below. Other features, objects, and advantages of these systems and methods will be apparent from the description and drawings, and from the claims.

DETAILED DESCRIPTION

As described above, DRX is a feature designed for a UE to save power. A UE operating under the DRX mode periodically switches between an "on" status (DRX-on) and a "sleep" status (DRX-sleep). During DRX-on, the UE is allowed to dynamically perform uplink data transmission with, e.g., a base station. During DRX-sleep, the UE generally does not perform uplink data transmission and the data generated by the UE accumulate in a data buffer. A DRX-on and a following DRX-sleep together form a DRX cycle.

A UE under the DRX mode may be configured by the base station to activate a feature of uplink CG. The uplink CGs are periodic occasions that give the UE opportunities to perform uplink transmissions, such us buffer data transmission and BSR transmission, even during DRX-sleep. Each CG occasion allows uplink transmission of a predefined size. These transmissions during DRX-sleep is designed to reduce data latency caused by non-transmission of uplink data during DRX-sleep. If the UE performs uplink transmission at a CG occasion during DRX-sleep, the UE transmitter activates, thereby consuming power.

Some UEs can be configured by a base station with small CG sizes transmitted at high frequencies (e.g., one physical resource block (PRB) every uplink slot), for transmitting BSR. After transmitting on the configured CG occasion, the UE wakes up to receive a retransmission grant. For a UE that is configured with high CG frequency, the transmitter activates more frequently and thus consumes more power, potentially reducing the power saving from DRX. Moreover, for UEs configured with small CG sizes, waking up at every CG occasion to transmit buffered data does not noticeably reduce data latency because the CG size is usually too small compared to the overall data packet size. Thus, waking up at every CG occasion can cause a problem with respect to the performance of the UE.

In light of this problem, UEs in some implementations are configured to omit buffer data or BSR transmission at some CG occasions. With the decrease of wakeup times during DRX-sleep, these implementations advantageously improve the UEs' power efficiency. These implementations are described below in detail with reference to the figures.

Figure 1:
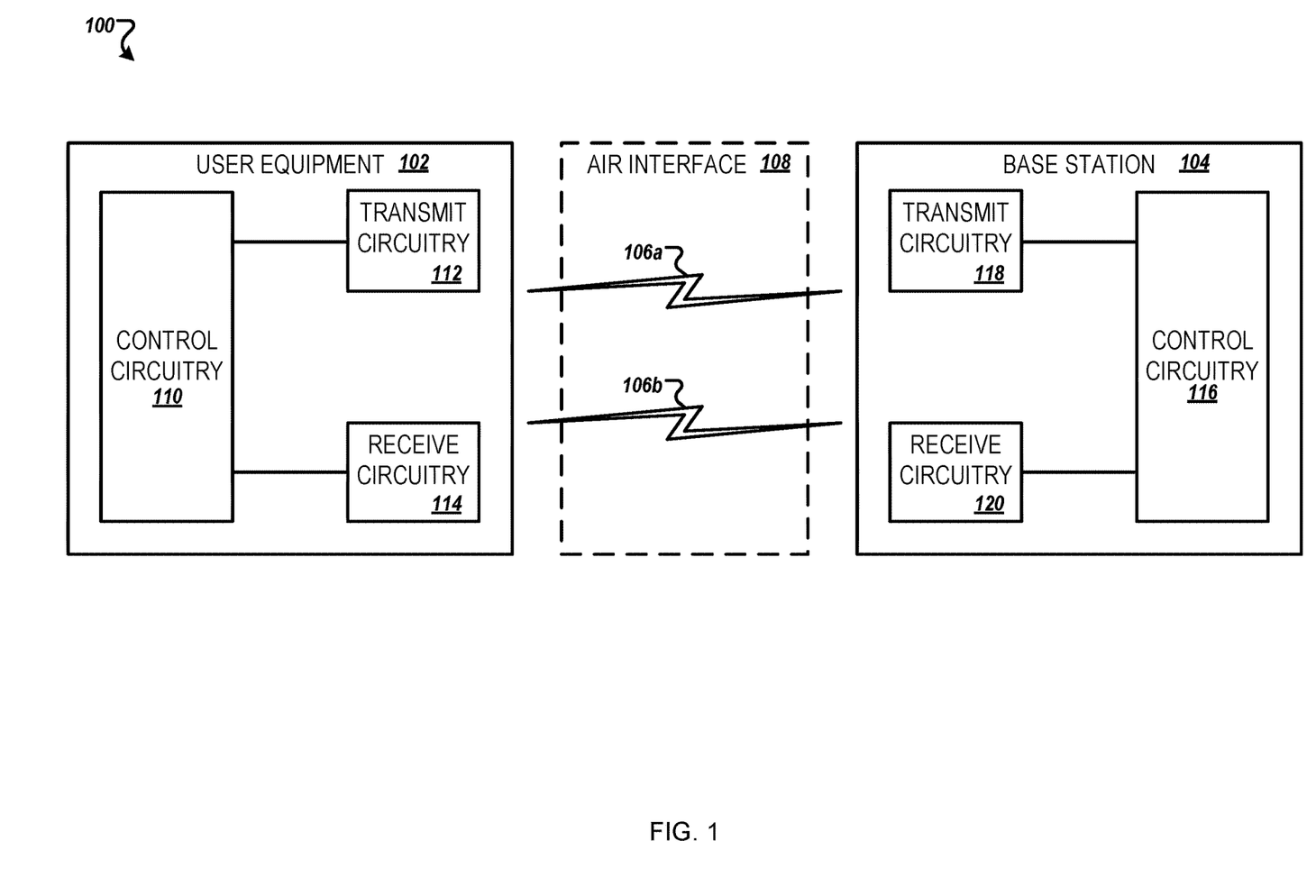
FIG. 1 illustrates a wireless network, according to some implementations.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates LTE and 5G NR communication standards as defined by the 3GPP technical specifications. For example, the wireless network 100 may be a E-UTRA (Evolved Universal Terrestrial Radio Access)-NR Dual Connectivity (EN-DC) network, or a NR-EUTRA Dual Connectivity (NE-DC) network. However, the wireless network 100 may also be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry.

In various implementations, aspects of the transmit circuitry 112, receive circuitry 114, and control circuitry 110 may be integrated in various ways to implement the operations described herein. For example, the control circuitry 110 may be configured to execute instructions that cause the UE to configure uplink CG occasions during a DRX cycle and determine whether to perform uplink transmission at uplink CG occasions. In addition, the transmit circuitry 112 may be configured to transmit the BSR or the buffered data at the uplink CG occasions, subject to the determination of the control circuitry 110. The transmit circuitry 112, receive circuitry 114, and control circuitry 110 may be adapted or configured to perform various operations such as those described elsewhere in this disclosure related to a UE.

Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The transmit circuitry 118 may transmit downlink physical channels includes of a plurality of downlink subframes. The receive circuitry 120 may receive a plurality of uplink physical channels from various UEs, including the UE 102. In some implementations, the receive circuitry 120 may receive the BSR or the buffered data transmitted by the UE 102.

In FIG. 1, the one or more channels 106A, 106B are illustrated as an air interface to enable communicative coupling, and can be consistent with cellular communications protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 102 may directly exchange communication data via a ProSe interface. The ProSe interface may alternatively be referred to as a sidelink interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH).

Figure 2A:
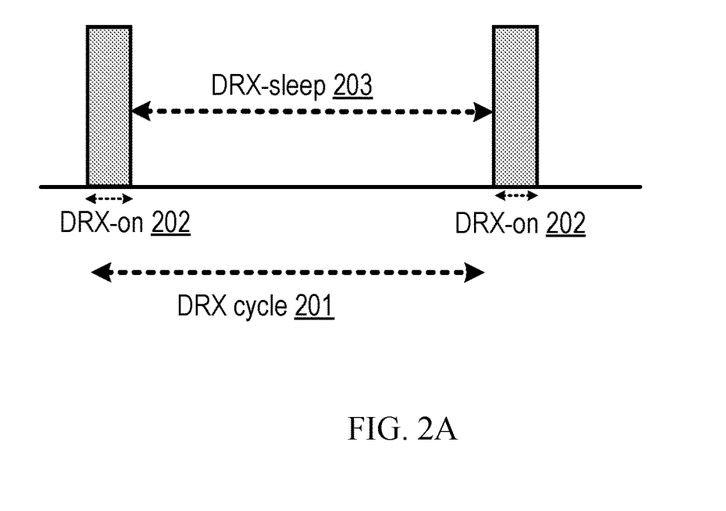
FIG. 2A illustrates a DRX cycle, according to some implementations.

FIG. 2A illustrates a DRX cycle, according to some implementations. As described above, a DRX cycle generally includes a duration when a UE dynamically exchanges data with a base station and a duration when the UE pauses such data exchange. Consistent with this, in FIG. 2A, a DRX cycle 201 starts with an "on" duration DRX-on 202, followed by a "sleep" duration DRX-sleep 203. In some implementations, the UE 102 can be configured to run a timer drx-onDuration to track DRX-on 202. That is, when drx-onDuration is running, the UE 102 is in DRX-on of a DRX cycle, and when drx-onDuration has expired, the UE 102 is in DRX-sleep of the DRX cycle.

Figure 2B:
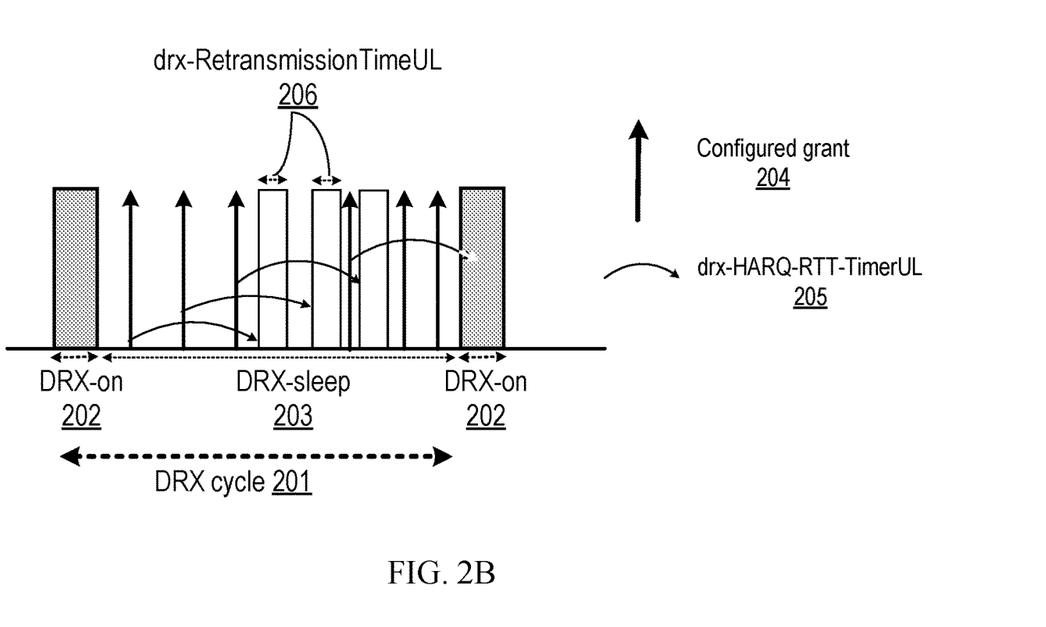
FIG. 2B illustrates a DRX cycle with uplink CGs activated, according to some implementations.

FIG. 2B illustrates a DRX cycle with uplink CGs activated, according to some implementations. As described above, the uplink CGs allow a UE to occasionally transmit data to a base station, even when the UE is at DRX-sleep. Consistent with this, as illustrated in FIG. 2B, a plurality of uplink CG occasions 204 periodically occur during the DRX cycle 201. The uplink CG occasions 204 need not be dynamically scheduled in advance by the base station 104 and can occur either during DRX-on 202 or DRX-sleep 203. In each of the uplink CG occasions 204, the UE 102 can transmit to the base station 104 uplink data up to a predefined size. The frequency of uplink CG occasions 204 and the size of uplink CG transmissions can be pre-configured by vendors of the UE 102. For example, some vendors configure the frequency of uplink CG occasions 204 to be high and the size of uplink CG transmissions to be small (one PRB per uplink slot in some implementations). Such configurations are designed to accommodate the needs for transmitting the BSR at uplink CG occasions 204.

If an uplink transmission at the uplink CG occasion 204 is not successfully received by the base station 104, then the base station 104 sends a retransmission grant to the UE 102, asking for retransmitting the same uplink data. Thus, every time the UE 102 wakes up and makes an uplink transmission at an uplink CG occasion 204, the UE 102 waits a period and wakes up again for a duration when the UE expects to receive a retransmission grant from the base station 104. The wait period between the uplink CG occasion 204 and the subsequent wakeup for receiving the retransmission grant is measured by a timer drx-HARQ-RTT-TimerUL 205, and the duration when the UE 102 expects the a retransmission grant is measured by a timer drx-RetransmissionTimerUL 206. That is, after the UE 102 makes an uplink transmission at the uplink CG occasion 204, the UE 102 starts the timer drx-HARQ-RTT-TimerUL 205. Upon expiration of the timer drx-HARQ-RTT-TimerUL 205, the UE 102 wakes up again and starts the timer drx-RetransmissionTimerUL 206, expecting to receive the retransmission grant from the base station 104. If no retransmission grant is received upon expiration of the timer drx-RetransmissionTimerUL 206, then the UE 102 assumes the uplink transmission has been successfully received by the base station 104.

From the description above, making an uplink transmission at every uplink CG occasion 204 can lead to unnecessary wake-ups during DRX-sleep 203. This can cause unnecessary power consumption. Thus, this disclosure provides a solution to reduce wake-up times and thereby reduce power consumption. Example implementations of the provided solution are described with the reference to FIGS. 3-7. The examples shown in FIGS. 3-7 can be implemented by a UE such as the UE 102 described in FIG. 1, or any other suitable devices. The description below assumes that the examples are implemented by the UE 102 in communication with the base station 104.

Figure 3:
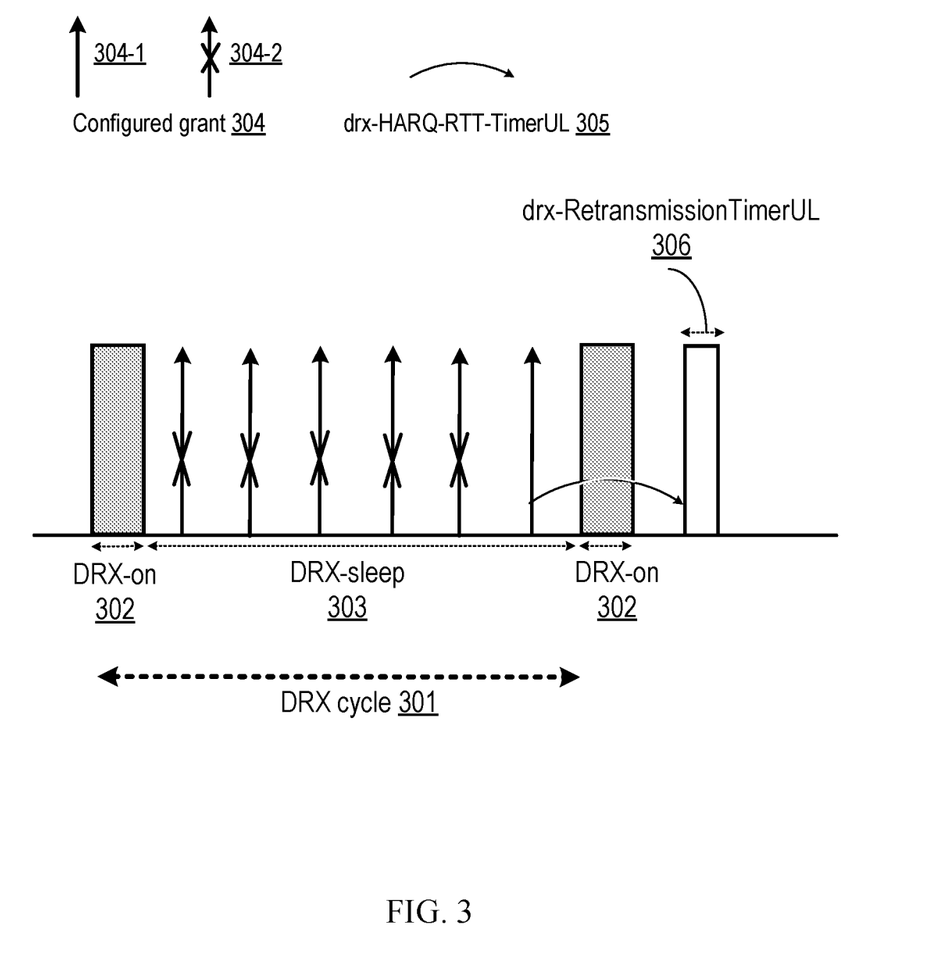
FIG. 3 illustrates an example for reducing power consumption during DRX, according to some implementations.

FIG. 3 illustrates an example for reducing power consumption during DRX, according to some implementations. Instead of having the UE 102 wake up to transmit at every uplink CG occasion, the UE 102 in this example is configured to determine whether to transmit and, if so, what to transmit. As such, this example reduces number of wake-ups during DRX-sleep and, hence, reduces power consumption.

In this example, a plurality of uplink CG occasions 304 are configured during DRX-sleep 303 of the DRX cycle 301, and the UE 102 conditionally performs uplink transmission at some uplink CG occasions 304-1 while omitting the other uplink CG occasions 304-2. Specifically, at a given uplink CG occasion 304, the UE 102 reads the data buffer and determines the size of data accumulated therein. The UE 102 then compares on the size of the accumulated data with an upper threshold data size and a lower threshold data size. Based on different comparison results, the UE 102 determines to transmit the accumulated buffer data, the BSR, or neither the accumulated buffer data nor the BSR.

Figure 4:
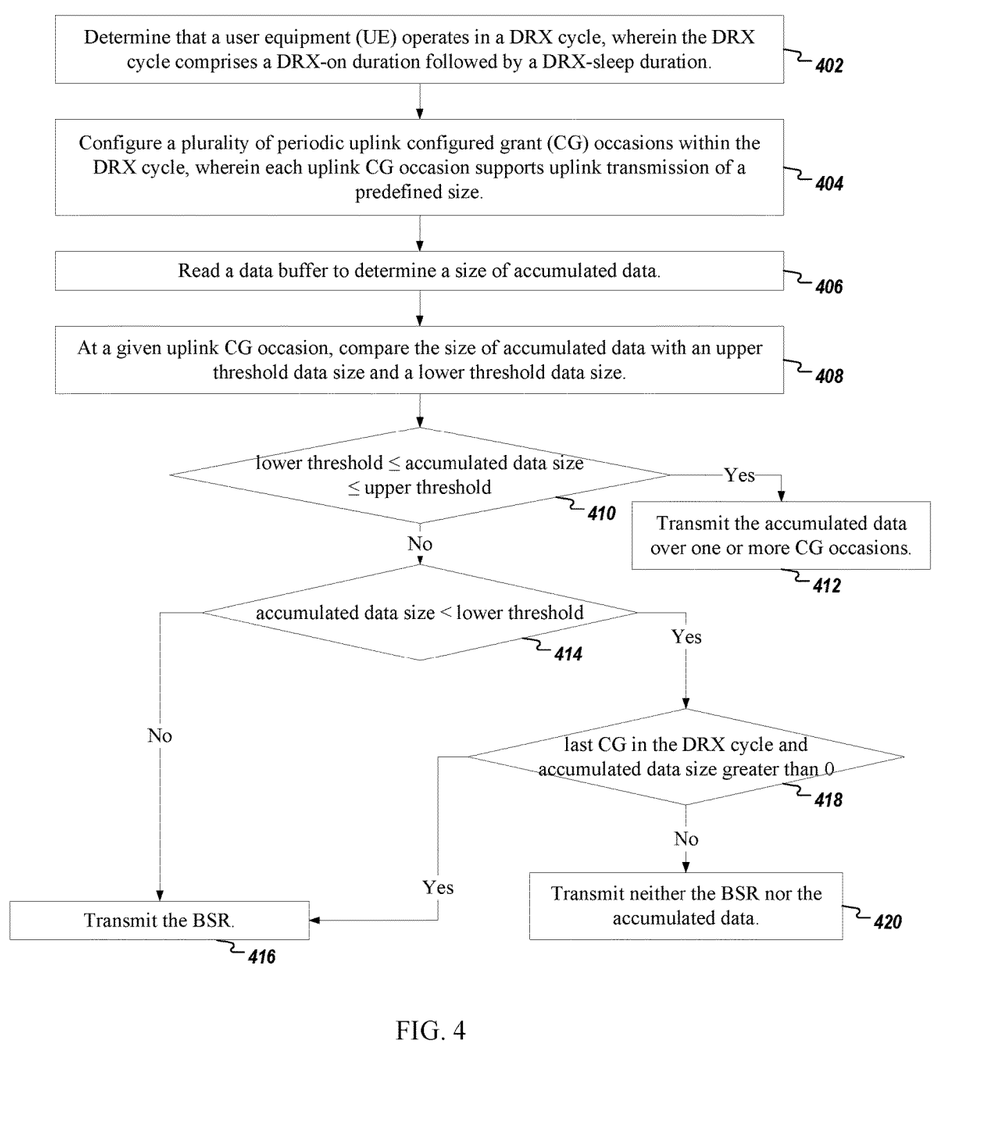
FIG. 4 illustrates a flowchart for determining transmission conditions, according to some implementations.

FIG. 4 illustrates a flowchart for determining transmission conditions for the buffered data, the BSR, or neither, according to some implementations of the example in FIG. 3. Steps 402-408 are substantially the same as those described above with reference to FIG. 3. These steps are thus omitted from description for simplicity. Steps 410-420 are described below in detail.

At step 410, the UE 102 determines, at a given uplink CG occasion, whether the size of accumulated buffer data is between the lower threshold data size and the upper threshold data size. The lower threshold data size represents a predefined size of accumulated buffer data that warrants an uplink transmission at one or more uplink CG occasions. The upper threshold data size represents the predefined size of accumulated buffer data that can be transmitted by the UE 102 over consecutive uplink CG occasions. In particular, the upper threshold data size can be calculated as CG size×N, where CG size denotes the predefined size of uplink transmission allowed at each uplink CG occasion, and N denotes the maximum number of consecutive uplink CG occasions allowed for uplink data transmission. Both the lower threshold data size and the number N can be configurable by, e.g. the base station 104.

In response to determining that the size of accumulated data is between the lower threshold data size and the upper threshold data size at step 410, the UE 102 transmits, at step 412 the accumulated data over one or more uplink CG occasions starting from the given uplink CG occasion. Otherwise, the UE 102 moves to step 414 for further determination.

At step 414, the UE 102 determines, at the given uplink CG occasion, whether the size of accumulated data is less than the lower threshold data size.

In response to determining that the size of accumulated data is not less than the lower threshold data size at step 414, the UE 102 transmits the BSR at step 416. Otherwise, the UE 102 moves to step 418 for further determination.

At step 418, the UE 102 determines, at the given uplink CG occasion, whether the given uplink CG occasion is a last uplink CG occasion within the DRX cycle and the size of accumulated data is greater than zero. Because of the periodicity of DRX cycles, the last uplink CG occasion within a DRX cycle means the uplink CG occasion is immediately before the DRX-on duration of the next DRX cycle.

In response to determining that the given uplink CG occasion is the last uplink CG occasion within the DRX cycle and the size of accumulated data is greater than zero, the UE 102 transmits the BSR at step 416. Otherwise, the UE 102 transmits neither the accumulated data nor the BSR at the given uplink CG occasion at step 420.

Consistent with FIG. 4, the example conditions for determining whether to transfer the buffered data, the BSR, or neither can be expressed with the below pseudo code:

If (threshold ≤ the size of accumulated data ≤ CG size × N):
  transmit the accumulated data over one or more uplink CG occasions;
Else if (the size of accumulated data < lower threshold data size):
  If ((last uplink CG occasion in the DRX cycle) AND (0 < the size of accumulated data)):
    transmit the BSR;
  Else:
    skip the given uplink CG occasion;
Else:
  transmit the BSR.

As can be seen from the example in FIGS. 3-4 and the pseudo code, the UE 102 omits uplink transmission at some uplink CG occasions under certain conditions. This feature can reduce the number of wakeups during DRX-sleep and advantageously save power.

Figure 5:
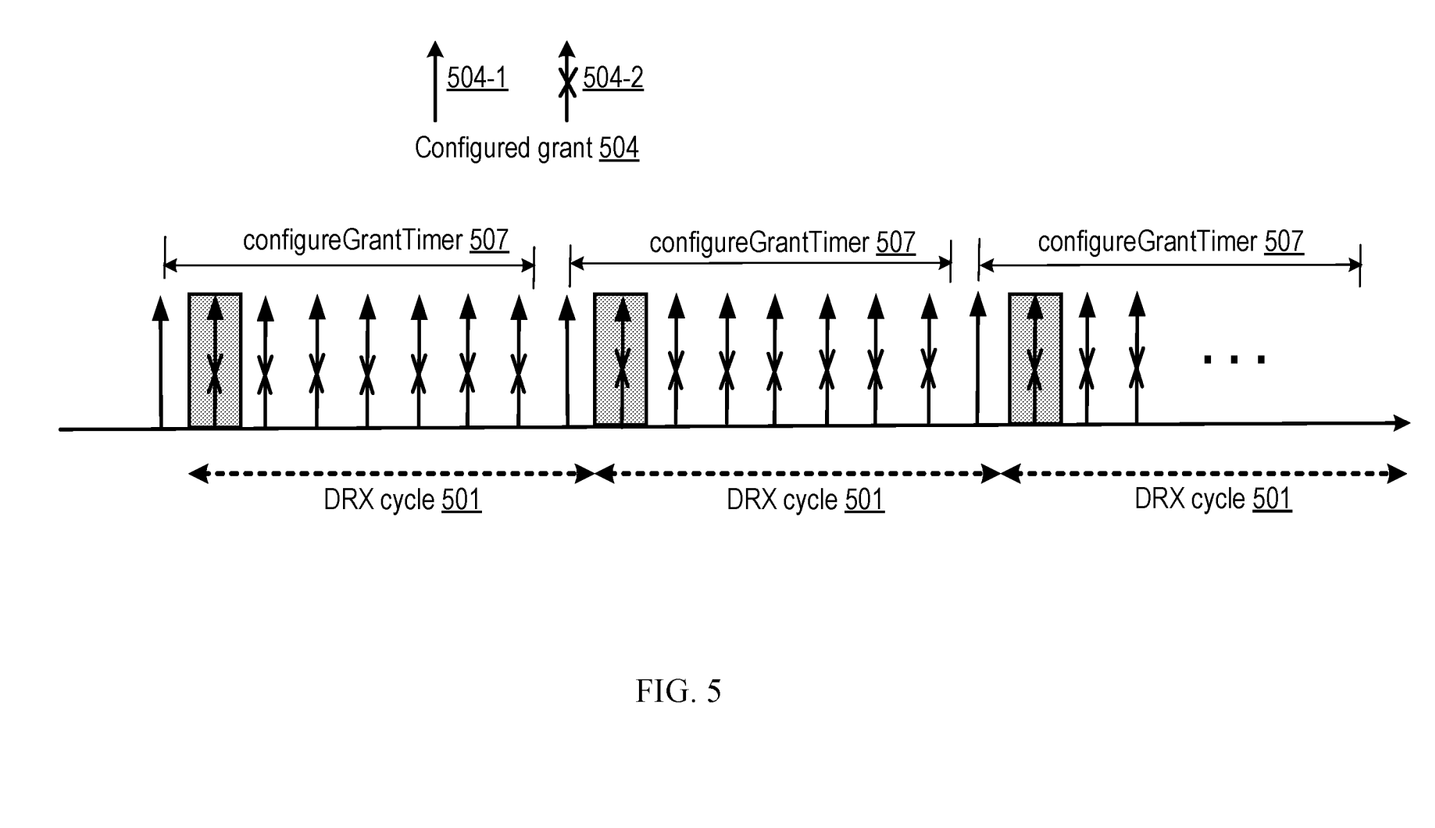
FIG. 5 illustrates another example for reducing power during DRX, according to some implementations.

FIG. 5 illustrates another example for reducing power consumption during DRX, according to some implementations. Different from the example shown in FIGS. 3 and 4, the UE 102 in the example of FIG. 5 does not transmit buffered data at uplink CG occasions 504. Instead, the UE 102 transmits a BSR to, e.g., the base station 104, only at the last uplink CG occasion 504-1 in a DRX cycle 501 while omitting the other uplink CG occasions 504-2 in the same DRX cycle 501.

More specifically, the UE 102 determines, at a given uplink CG occasion 504, whether the given uplink CG occasion is the last uplink CG occasion 504-1 in the DRX cycle 501. If the answer is Yes, then the UE 102 transmits the BSR at the last uplink CG occasion 504-1; otherwise, the UE 102 omits this uplink CG occasion 504 and transmits neither the BSR nor buffered data.

In some implementations, the UE 102 makes the determination based on a timer parameter configuredGrantTimer 507 received from the base station 104. The timer parameter configuredGrantTimer 507 can be determined by the base station 104 based on a length of the DRX cycle 501 and a periodicity of the uplink CG occasions 504.

For example, the timer parameter configuredGrantTimer 507 can be determined as $$\frac{DRXcycle}{CGperiodicity} - 1,$$

where DRXcycle denotes the length of the DRX cycle 501 and CGperiodicity denotes the periodicity of the uplink CG occasions 504. In this case, the timer parameter configuredGrantTimer 507 corresponds to the number of uplink CG occasions 504 within the DRX cycle 501 minus one. The timer parameter configuredGrantTimer 507 thus gives the UE 102 knowledge about the interval between two last uplink CG occasions 504-1. The UE 102 can start counting from zero at a certain moment (e.g., immediately before the beginning) of the DRX cycle 501, transmit the BSR upon counting the timer parameter configuredGrantTimer 507, and omit the other uplink CG occasions 504.

The timer parameter configuredGrantTimer 507 can be configured by the base station 104 and broadcast to the UE 102 along with configuration of the uplink CG occasions 504. In some implementations, the base station 104 can configure the timer parameter configuredGrantTimer 507 whenever DRX is configured and a dedicated bearer has been established (i.e., an N301/low latency session is present).

Similar to the example illustrated in FIGS. 3-4, the UE 102 in the example of FIG. 5 omits uplink transmission at some uplink CG occasions under certain conditions. This feature can reduce the number of wakeups during DRX-sleep and advantageously save power.

Figure 6:
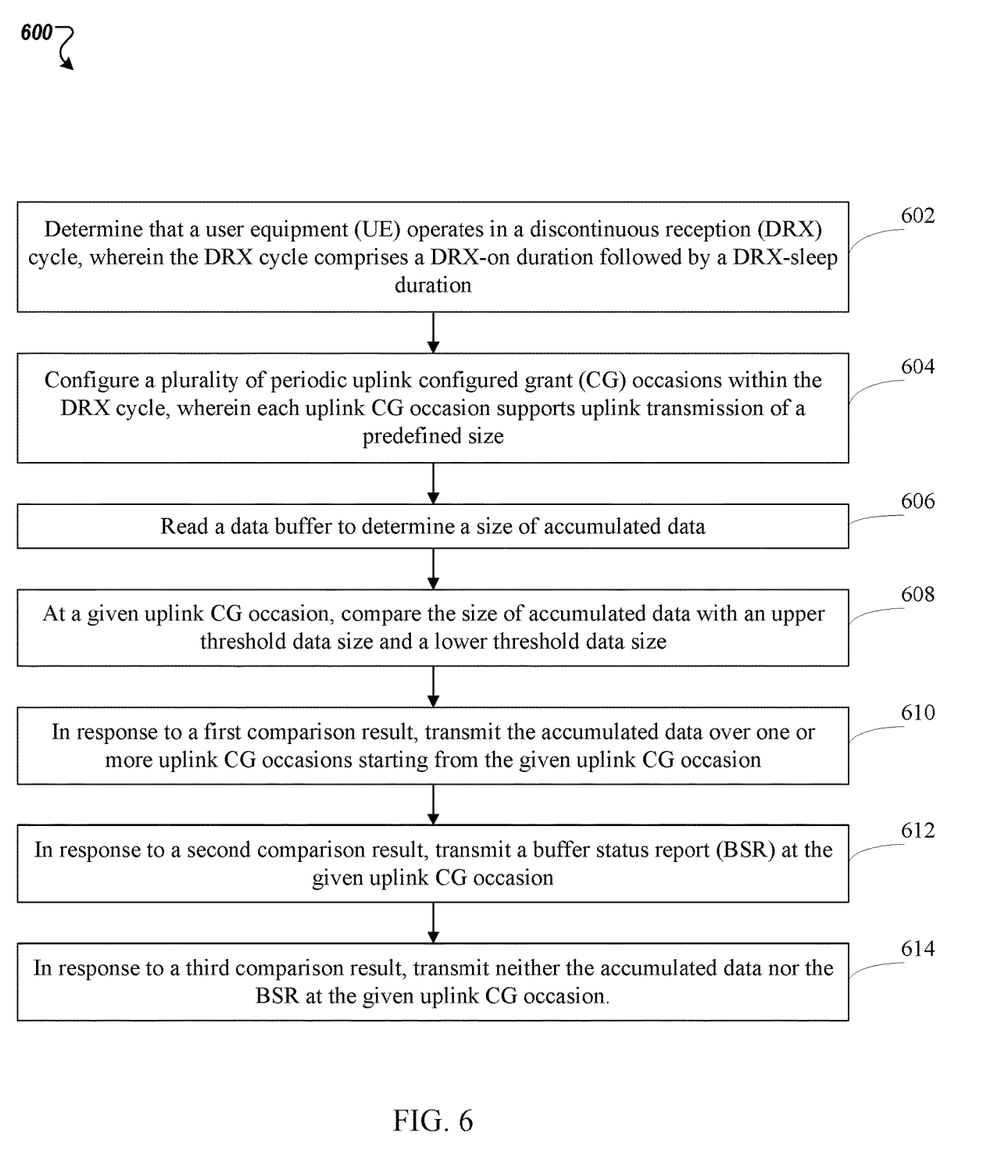
FIG. 6 illustrates a flowchart of an example method, according to some implementations.
Figure 7:
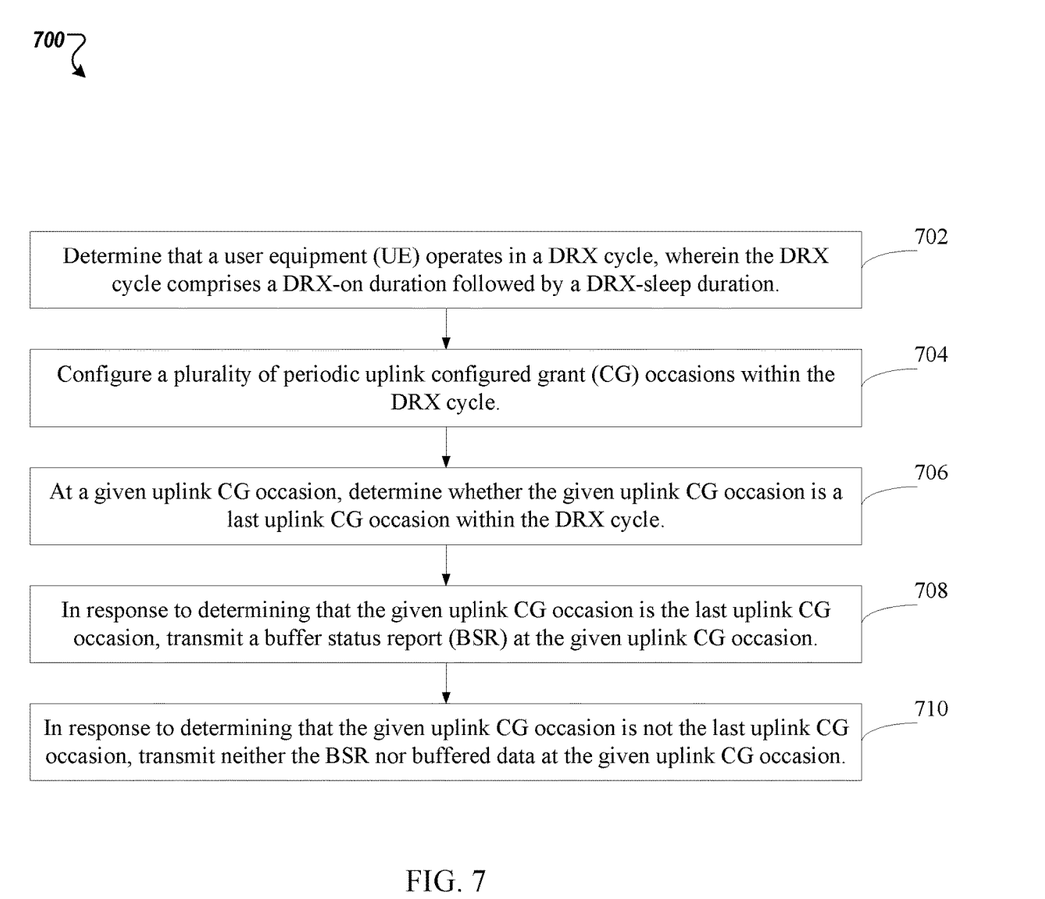
FIG. 7 illustrates a flowchart of another example method, according to some implementations.

FIGS. 6 and 7 each illustrate a flowchart of example methods 600 and 700, respectively, according to some implementations. The various steps of example methods 600 and 700 can be implemented as computer-readable instructions that cause a UE to execute the operations described above. For clarity of presentation, the description that follows generally describes methods 600 and 700 in the context of the other figures in this description. For example, methods 600 and 700 can be performed by the UE 102 of FIG. 1. It will be understood that methods 600 and 700 can be performed, for example, by any suitable system, environment, software, hardware, or a combination of systems, environments, software, and hardware, as appropriate. In some implementations, various steps of methods 600 and 700 can be run in parallel, in combination, in loops, or in any order.

In FIG. 6, at step 602, method 600 involves determining that a UE operates in a DRX cycle, wherein the DRX cycle comprises a DRX-on duration followed by a DRX-sleep duration.

At step 604, method 600 involves configuring a plurality of periodic uplink CG occasions within the DRX cycle, wherein each uplink CG occasion supports uplink transmission of a predefined size.

At step 606, method 600 involves reading a data buffer to determine a size of accumulated data.

At step 608, method 600 involves comparing the size of accumulated data with an upper threshold data size and a lower threshold data size at a given uplink CG occasion.

At step 610, method 600 involves in response to a first comparison result, transmitting the accumulated data over one or more uplink CG occasions starting from the given uplink CG occasion.

At step 612, method 600 involves in response to a second comparison result, transmitting a BSR at the given uplink CG occasion.

At step 614, method 600 involves in response to a third comparison result, transmitting neither the accumulated data nor the BSR at the given uplink CG occasion.

In some implementations, method 600 further involves determining the upper threshold data size by multiplying the predefined size by a maximum number of uplink CG occasions.

In some implementations, the first comparison result is determined when the size of accumulated data is between the lower threshold data size and the upper threshold data size. The second comparison result is determined when (i) the first comparison result is not determined, (ii) the size of accumulated data is greater than zero and less than the lower threshold data size, and (iii) the given uplink CG occasion is a last uplink CG occasion within the DRX cycle. The third comparison result is determined when (iv) the first comparison result is not determined, (v) the size of accumulated data is less than the lower threshold data size, and (vi) the second comparison result is not determined. The determination of the first, the second, and the third comparison results can correspond to the determination described with reference to steps 410, 414, and 418 of FIG. 4.

In some implementations, method 600 further involves in response to determining none of the first comparison result, the second comparison result, and the third comparison result, transmitting the BSR at the given uplink CG occasion.

In FIG. 7, at step 702, method 700 involves determining that a UE operates in a DRX cycle, wherein the DRX cycle comprises a DRX-on duration followed by a DRX-sleep duration.

At step 704, method 700 involves configuring a plurality of periodic uplink CG occasions within the DRX cycle.

At step 706, method 700 involves determining, at a given uplink CG occasion, whether the given uplink CG occasion is a last uplink CG occasion within the DRX cycle At step 708, method 700 involves in response to determining that the given uplink CG occasion is the last uplink CG occasion, transmitting a BSR at the given uplink CG occasion to a base station.

At step 710, method 700 involves in response to determining that the given uplink CG occasion is not the last uplink CG occasion, transmitting neither the BSR nor buffered data at the given uplink CG occasion to the base station.

In some implementations, step 706 involves: receiving, from the base station, a timer parameter determined based on a length of the DRX cycle and a periodicity of the plurality of periodic uplink CG occasions; and starting the timer at a certain moment of the DRX cycle. In some implementations, the timer parameter is determined as $$\frac{DRXcycle}{CGperiodicity} - 1,$$

where DRXcycle denotes the length of the DRX cycle and CGperiodicity denotes the periodicity of the plurality of periodic uplink CG occasions. Further, in some implementations, the timer parameter is configured in response to establishing a dedicated bearer.

Figure 8:
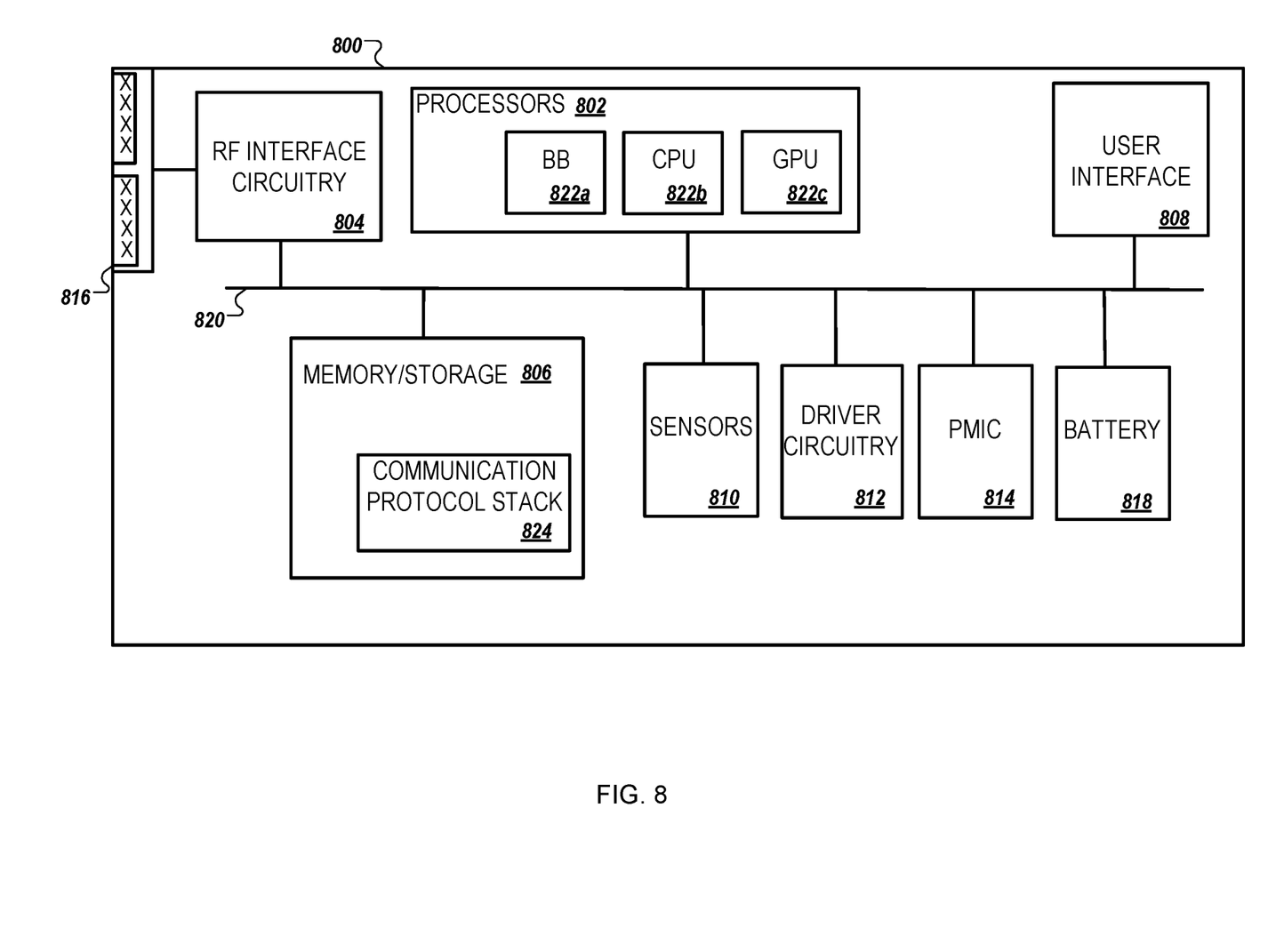
FIG. 8 illustrates a UE, according to some implementations.

FIG. 8 illustrates a UE 800, according to some implementations. The UE 800 may include processors 802, RF interface circuitry 804, memory/storage 806, user interface 808, sensors 810, driver circuitry 812, power management integrated circuit (PMIC) 814, antenna structure 816, and battery 818. The components of the UE 800 may be implemented as integrated circuits (ICs), portions thereof, discrete electronic devices, or other modules, logic, hardware, software, firmware, or a combination thereof.

The UE 800 may be similar to and substantially interchangeable with UE 102 of FIG. 1. For example, the processors 802 of the UE 800 may be similar to the control circuitry 110 of the UE 102, and the RF interface circuitry 804 of the UE 800 may be similar to the transmit circuitry 112 and the receive circuitry 114.

The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 820, which may represent any type of interface, input/output, bus (local, system, or expansion), transmission line, trace, optical connection, etc. that allows various circuit components (on common or different chips or chipsets) to interact with one another.

The processors 802 may include processor circuitry such as, for example, baseband processor circuitry (BB) 822A, central processor unit circuitry (CPU) 822B, and graphics processor unit circuitry (GPU) 822C. The processors 802 may include any type of circuitry or processor circuitry that executes or otherwise operates computer-executable instructions, such as program code, software modules, or functional processes from memory/storage 806 to cause the UE 800 to perform operations as described herein.

In some implementations, the baseband processor circuitry 822A may access a communication protocol stack 824 in the memory/storage 806 to communicate over a 3GPP compatible network. In general, the baseband processor circuitry 822A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 804. The baseband processor circuitry 822A may generate or process baseband signals or waveforms that carry information in 3GPP-compatible networks. In some implementations, the waveforms for NR may be based cyclic prefix OFDM "CP-OFDM" in the uplink or downlink, and discrete Fourier transform spread OFDM "DFT-S-OFDM" in the uplink.

The memory/storage 806 may include one or more non-transitory, computer-readable media that includes instructions (for example, communication protocol stack 824) that may be executed by one or more of the processors 802 to cause the UE 800 to perform various operations described herein. The memory/storage 806 include any type of volatile or non-volatile memory that may be distributed throughout the UE 800. In some implementations, some of the memory/storage 806 may be located on the processors 802 themselves (for example, L1 and L2 cache), while other memory/storage 806 is external to the processors 802 but accessible thereto via a memory interface. The memory/storage 806 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 804 may include transceiver circuitry and radio frequency front module (RFEM) that allows the UE 800 to communicate with other devices over a radio access network. The RF interface circuitry 804 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 816 and proceed to filter and amplify (with a low-noise amplifier) the signal. The signal may be provided to a receiver of the transceiver that downconverts the RF signal into a baseband signal that is provided to the baseband processor of the processors 802.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 816. In various implementations, the RF interface circuitry 804 may be configured to transmit/receive signals in a manner compatible with NR access technologies.

The antenna 816 may include antenna elements to convert electrical signals into radio waves to travel through the air and to convert received radio waves into electrical signals. The antenna elements may be arranged into one or more antenna panels. The antenna 816 may have antenna panels that are omnidirectional, directional, or a combination thereof to enable beamforming and multiple input, multiple output communications. The antenna 816 may include microstrip antennas, printed antennas fabricated on the surface of one or more printed circuit boards, patch antennas, phased array antennas, etc. The antenna 816 may have one or more panels designed for specific frequency bands including bands in FR1 or FR2.

The user interface 808 includes various input/output (I/O) devices designed to enable user interaction with the UE 800. The user interface 808 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 800.

The sensors 810 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 812 may include software and hardware elements that operate to control particular devices that are embedded in the UE 800, attached to the UE 800, or otherwise communicatively coupled with the UE 800. The driver circuitry 812 may include individual drivers allowing other components to interact with or control various input/output (I/O) devices that may be present within, or connected to, the UE 800. For example, driver circuitry 812 may include a display driver to control and allow access to a display device, a touchscreen driver to control and allow access to a touchscreen interface, sensor drivers to obtain sensor readings of sensor circuitry 828 and control and allow access to sensor circuitry 828, drivers to obtain actuator positions of electro-mechanic components or control and allow access to the electro-mechanic components, a camera driver to control and allow access to an embedded image capture device, audio drivers to control and allow access to one or more audio devices.

The PMIC 814 may manage power provided to various components of the UE 800. In particular, with respect to the processors 802, the PMIC 814 may control power-source selection, voltage scaling, battery charging, or DC-to-DC conversion.

In some implementations, the PMIC 814 may control, or otherwise be part of, various power saving mechanisms of the UE 800. A battery 818 may power the UE 800, although in some examples the UE 800 may be mounted deployed in a fixed location, and may have a power supply coupled to an electrical grid. The battery 818 may be a lithium ion battery, a metal-air battery, such as a zinc-air battery, an aluminum-air battery, a lithium-air battery, and the like. In some implementations, such as in vehicle-based applications, the battery 818 may be a typical lead-acid automotive battery.

Figure 9:
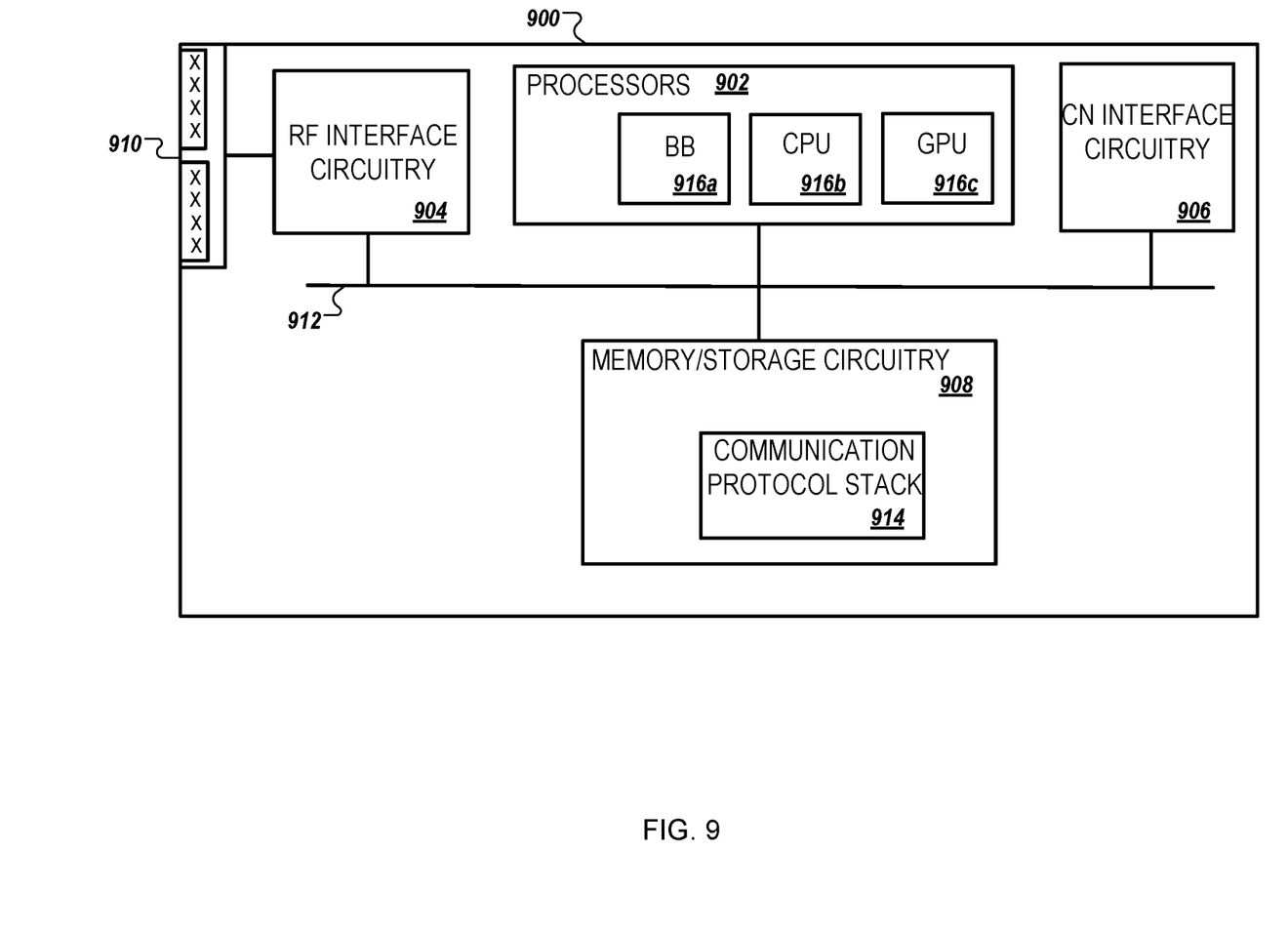
FIG. 9 illustrates an access node, according to some implementations.

FIG. 9 illustrates an access node 900 (e.g., a base station or gNB), according to some implementations. The access node 900 may include processors 902, RF interface circuitry 904, core network (CN) interface circuitry 906, memory/storage circuitry 908, and antenna structure 910.

The access node 900 may be similar to and substantially interchangeable with base station 104. For example, the processors 902 of the access node 900 may be similar to the control circuitry 116 of the base station 104, and the RF interface circuitry 904 of the access node 900 may be similar to the transmit circuitry 118 and the receive circuitry 120.

The components of the access node 900 may be coupled with various other components over one or more interconnects 912. The processors 902, RF interface circuitry 904, memory/storage circuitry 908 (including communication protocol stack 914), antenna structure 910, and interconnects 912 may be similar to like-named elements shown and described with respect to FIG. 8. For example, the processors 902 may include processor circuitry such as, for example, BB 916A, CPU 916B, and GPU 916C.

The CN interface circuitry 906 may provide connectivity to a core network, for example, a 5th Generation Core network (5GC) using a 5GC-compatible network interface protocol such as carrier Ethernet protocols, or some other suitable protocol. Network connectivity may be provided to/from the access node 900 via a fiber optic or wireless backhaul. The CN interface circuitry 906 may include one or more dedicated processors or FPGAs to communicate using one or more of the aforementioned protocols. In some implementations, the CN interface circuitry 906 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 900 that operates in an NR or 5G system (for example, a gNB), and the term "E-UTRAN node" or the like may refer to an access node 900 that operates in an LTE or 4G system (e.g., an eNB). According to various implementations, the access node 900 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 900 may be implemented as one or more software entities running on server computers as part of a virtual network, which may be referred to as a CRAN and/or a virtual baseband unit pool (vBBUP). In V2X scenarios, the access node 900 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more implementations, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A processor comprising circuitry to execute one or more instructions that, when executed, cause a user equipment (UE) to perform operations comprising:
    determining that the UE operates in a discontinuous reception (DRX) cycle, wherein the DRX cycle comprises a DRX-on duration followed by a DRX-sleep duration;
    configuring a plurality of periodic uplink configured grant (CG) occasions within the DRX cycle, wherein each uplink CG occasion supports uplink transmission of a predefined size;
    reading a data buffer to determine a size of accumulated data;
    at a given uplink CG occasion, comparing the size of accumulated data with an upper threshold data size and a lower threshold data size;
    in response to a first comparison result, transmitting the accumulated data over one or more uplink CG occasions starting from the given uplink CG occasion;
    in response to a second comparison result, transmitting a buffer status report (BSR) at the given uplink CG occasion; and
    in response to a third comparison result, transmitting neither the accumulated data nor the BSR at the given uplink CG occasion.

2. The processor of claim 1, wherein the operations further comprise:
    determining the upper threshold data size by multiplying the predefined size by a maximum number of uplink CG occasions.

3. The processor of claim 1, wherein the first comparison result is determined when the size of accumulated data is between the lower threshold data size and the upper threshold data size.

4. The processor of claim 3, wherein the second comparison result is determined when:
    the first comparison result is not determined;
    the size of accumulated data is greater than zero and less than the lower threshold data size; and
    the given uplink CG occasion is a last uplink CG occasion within the DRX cycle.

5. The processor of claim 4, wherein the third comparison result is determined when:
    the first comparison result is not determined;
    the size of accumulated data is less than the lower threshold data size; and
    the second comparison result is not determined.

6. The processor of claim 5, wherein the operations further comprise:
    in response to determining none of the first comparison result, the second comparison result, and the third comparison result, transmitting the BSR at the given uplink CG occasion.

7. A user equipment (UE) comprising:
    a processor; a memory comprising a data buffer; and a transmitter,
    wherein the processor determines that the UE operates in a discontinuous reception (DRX) cycle, the DRX cycle comprising a DRX-on duration followed by a DRX-sleep duration,
    wherein the processor configures a plurality of periodic uplink configured grant (CG) occasions within the DRX cycle, each uplink CG occasion supporting uplink transmission of a predefined size;
    wherein the processor reads the data buffer to determine a size of accumulated data,
    wherein, at a given uplink CG occasion, the processor compares the size of accumulated data with an upper threshold data size and a lower threshold data size,
    wherein, in response to a first comparison result, the transmitter transmits the accumulated data over one or more uplink CG occasions starting from the given uplink CG occasion;
    wherein, in response to a second comparison result, the transmitter transmits a buffer status report (BSR) at the given uplink CG occasion; and
    wherein, in response to a third comparison result, the transmitter transmits neither the accumulated data nor the BSR at the given uplink CG occasion.

8. The UE of claim 7, wherein the processor determines the upper threshold data size by multiplying the predefined size by a maximum number of uplink CG occasions.

9. The UE of claim 7, wherein the processor determines the first comparison result when the size of accumulated data is between the lower threshold data size and the upper threshold data size.

10. The UE of claim 9, wherein the processor determines the second comparison result when:
- the first comparison result is not determined;
- the size of accumulated data is greater than zero and less than the lower threshold data size; and
- the given uplink CG occasion is a last uplink CG occasion within the DRX cycle.

11. The UE of claim 10, wherein the processor determines the third comparison result when:
- the first comparison result is not determined;
- the size of accumulated data is less than the lower threshold data size; and
- the second comparison result is not determined.

12. The UE of claim 11, wherein in response to that the processor determines none of the first comparison result, the second comparison result, and the third comparison result, the transmitter transmits the BSR at the given uplink CG occasion.

13. A processor comprising circuitry to execute one or more instructions that, when executed, cause a user equipment (UE) to perform operations comprising:
- determining that the UE operates in a discontinuous reception (DRX) cycle, wherein the DRX cycle comprises a DRX-on duration followed by a DRX-sleep duration;
- configuring a plurality of periodic uplink configured grant (CG) occasions within the DRX cycle;
- at a given uplink CG occasion, determining whether the given uplink CG occasion is a last uplink CG occasion within the DRX cycle, wherein the determining is based on an interval between two uplink CG occasions of the DRX cycle;
- in response to determining that the given uplink CG occasion is the last uplink CG occasion, transmitting a buffer status report (BSR) at the given uplink CG occasion to a base station; and
- in response to determining that the given uplink CG occasion is not the last uplink CG occasion, transmitting neither the BSR nor buffered data at the given uplink CG occasion to the base station.

14. The processor of claim 13, wherein determining whether the given uplink CG occasion is the last uplink CG occasion within the DRX cycle comprises:
- receiving, from the base station, a timer parameter determined based on a length of the DRX cycle and a periodicity of the plurality of periodic uplink CG occasions; and
- starting the timer at a certain moment of the DRX cycle.

15. The processor of claim 14, wherein the timer parameter is determined as $$\frac{DRXcycle}{CGperiodicity} - 1,$$

where DRXcycle denotes the length of the DRX cycle and CGperiodicity denotes the periodicity of the plurality of periodic uplink CG occasions.

16. The processor of claim 14, wherein the timer parameter is configured in response to establishing a dedicated bearer.

17. The processor of claim 14, wherein configuration information indicating the timer parameter is received from the base station with information indicating a configuration of the plurality of periodic CG occasions within the DRX cycle.

18. The processor of claim 1, wherein the lower threshold size is greater than zero.

19. The UE of claim 7, wherein the lower threshold size is greater than zero.

* * * * *